Sept. 14, 1926.

C. B. KOSTERS

SHOE TREE

Filed August 22, 1925

1,599,900

INVENTOR
Clements B Kosters
By
Parker & Brochnow
ATTORNEYS

Patented Sept. 14, 1926.

1,599,900

UNITED STATES PATENT OFFICE.

CLEMENTS B. KOSTERS, OF BUFFALO, NEW YORK.

SHOE TREE.

Application filed August 22, 1925. Serial No. 51,758.

This invention relates to shoe trees or expansible forms intended to be placed in shoes for preventing them from wrinkling and for preserving the original appearance and shape of the shoes.

Shoe trees of various constructions have been heretofore made, but those trees which have been made to conform to the shape of and properly fit and fill out the various portions the shoe including the toe, vamp and counter, so as to properly preserve the shape of these various portions, have been of relatively complicated and expensive construction, and each tree is ordinarily only adapted for use in a particular size or very limited range of sizes of shoes, thus necessitating a large number of trees to be carried in stock in order to fit the various different sizes of shoes. Less expensive forms or trees have been made, but these, as a rule, do not nicely fit and preserve the original shape of the shoe.

The principal object of this invention is to produce a practical and desirable shoe tree or form, which is of inexpensive construction, and can be sold at a low price, but which nevertheless is adapted to nicely fit the toe, vamp and counter of the shoes and effectually preserve the original shape of the shoes, the construction being such that a single tree or form is adapted for use in shoes differing considerably in size and shape, so that only a very limited number of different sizes of trees will be required for the various different sizes of shoes; for example, two different sizes of trees or forms only constructed in accordance with my invention will suffice for all of the usual different sizes, both as to length and breadth of men's shoes, and a correspondingly low number of different sizes of trees will suffice for the various different sizes of ladies' shoes.

In the accompanying drawings:—

Figure 1:
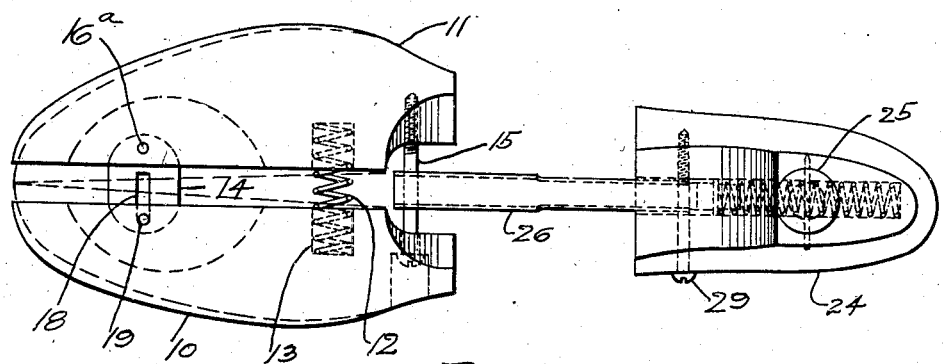
Fig. 1 is a plan view of a shoe tree embodying my invention.
Figure 2:
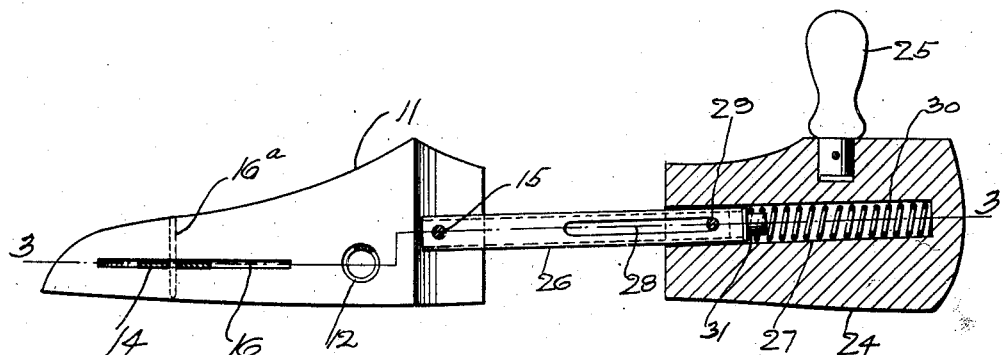
Fig. 2 is a longitudinal central sectional elevation thereof.
Figure 3:
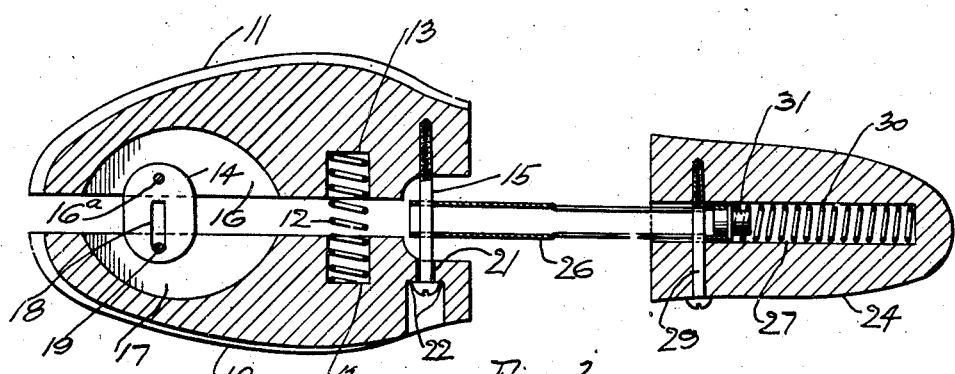
Fig. 3 is a horizontal section thereof on line 3—3, Fig. 2.
Figure 4:
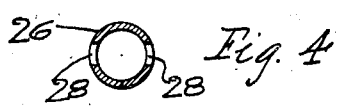
Fig. 4 is a cross section of the number connecting the front and heel forms of the tree.

The shoe tree comprises front and rear forms or parts, preferably made of wood, which are adjustably connected for shortening and lengthening the tree to fit shoes of different lengths and for expanding the tree lengthwise to hold the shoe under the requisite tension to preserve the shape thereof, and the front form of the tree comprises opposite halves or sections which are expansible and contractible laterally to fit shoes of different widths and shapes and exert the required tension laterally on the toe and vamp portions of the shoe.

The front form of the tree is divided longitudinally and centrally on a vertical plane so as to form right and left side sections 10 and 11, which are shaped so as to conform to and snugly fit the toe and vamp portions of the shoe and fill these portions of the shoe and hold the same under tension produced by a spring, preferably a coil spring, which is seated in aligned pockets 13 bored transversely and horizontally in the adjacent sides of the two sections 10 and 11 of the form between the ends thereof. The two sections 10 and 11 are connected so as to limit the distance that the spring can separate the sections but permit the sections to be pressed towards each other and to assume different angular relations to each other, preferably by a plate 14 in front of the spring 12, and by a transverse bolt pin or rod 15 located to the rear of the spring. The plate 14 is seated in a saw kerf or slot 16 in the section 11 and is secured therein by a pin or fastening 16ª of any suitable sort driven into the wooden section 11 and entering a hole in the plate, and the opposite end of the plate extends into and is adapted to slide freely transversely in a corresponding saw kerf or slot 17 in the other section 10 of the tree. The plate 14 is provided with a slot 18 extending transversely of the tree and a pin or other fastening 19 is driven into the form section 10 through the slot 18. The end of the slot 18 is adapted to engage the pin 19 to limit the movement of the sections 10 and 11 away from each other, but this pin and slot connection of the plate with one of the form sections 10 and 11 permits the movement of the sections toward and from each other. The slot is sufficiently wide to permit the sections 10 and 11 of the form to assume positions either parallel with each other or at different angles to each other, in which the sections may diverge either forwardly or rearwardly, whereby either the front or rear ends of the sections can spread more than the opposite ends, as may be necessary to fit either narrow or wide toe shoes. The screw or pin 15 connecting the sections 10 and 11 at their rear portions passes loosely through a hole in one of the sections and is screwed into the other section. This hole 21 is counter-bored so as to provide a shoulder 22 at its inner portion against which the head of the screw is adapted to bear to limit the separation of the rear ends of the sections of the front form. The hole 21 is large enough to allow sufficient play of the screw therein to permit the sections 10 and 11 to assume the angular or inclined positions before mentioned.

The rear form or part of the tree preferably consists of a wooden block 24 which is shaped to nicely fit the heel and counter of the shoe, and this block 24 is preferably provided with an upwardly extending handle 25 for manipulating the tree to place it in and remove it from the shoes. The front and rear forms are connected by a longitudinal member 26. This connecting member preferably consists of a cylindrical tube split or divided longitudinally along its underside. The screw 15 connecting the rear ends of the front form section extends loosely through holes in the front end of the tube 26, which enters a recess between the front form sections, thereby pivotally connecting the tube to the front form, and the rear portion of the tube slidably fits in a central longitudinal cavity or bore 27 in the rear form 24 and is provided at its sides with longitudinal slots 28 through which loosely passes a transverse screw or pin 29 secured in the rear form. A coil spring 30 located in the cavity 27 in the rear form bears at its front end against the rear end of the tube, preferably by means of a spring plug 31 seated in the rear end of the tube 26, and the spring acts to press the rear form rearwardly and hold it yieldingly away from the front form. The connecting tube 26 is preferably formed from a flat strip of metal which is punched to form the front pivot holes and the side slots 28, and is then bent into tubular form with the side edges meeting at the underside of the tube. This manner of forming the tube is less expensive than by cutting and forming the same from tubular stock. The pin and slot connection between the tube 26 and the rear form 24 permits the latter to be moved forwardly and rearwardly on the connecting tube, and the tube is adapted to swing vertically on its pivotal connection with the front form, thus permitting the tree to be shortened or contracted lengthwise and the rear form to be swung up or down when inserting the tree into the shoe, and when the tree has been inserted, the spring 30 will press the front and rear forms of the tree apart, thus shoving or seating the front form of the tree forwardly into the front portion of the shoe and the rear form 24 rearwardly into the counter of the shoe and exerting longitudinal tension on the leather or material of the shoe. This construction also enables the front and rear forms to be moved toward and from each other, as may be necessary, to properly fit shoes of different lengths or sizes.

The tree constructed as above described is thus adapted to be used in shoes of different sizes or lengths, and inasmuch as the sections 10 and 11 of the front form are expansible and contractible laterally and also adapted to assume positions at an inclination to each other, diverging either forwardly or rearwardly, the tree is also adapted to fit shoes of different widths and also of different shapes, that is having narrow or broad toes. Thus, a single tree of the construction described is adapted to fit a variety of different sizes and shapes of shoes, and conform to the shape thereof, and retain the same under tension in their original form.

I claim as my invention:—

1. A shoe tree comprising a front form composed of laterally movable sections, a spring acting to spread said sections apart, a transverse member which loosely connects said sections in rear of said spring and limits the spreading movement of said sections by said spring and permits the sections to assume different angular positions relatively to each other, means loosely connecting said sections in front of said spring and limiting the separation of the front ends of the sections, a rear form, a connecting member pivotally connected to said transverse member between the front form sections and slidably engaging in a longitudinal cavity in said rear form, and an enclosed spring acting against said connecting member and rear form to press said rear form rearwardly away from said front form, and means for limiting the rearward movement of said rear form.

2. A shoe tree comprising a front form composed of laterally movable sections, a transverse rod connecting said sections at their rear portions, a spring for pressing said form sections apart, a rear form having a longitudinal cavity therein, a connecting member pivoted on said transverse rod between the sections of said front form and slidably engaging in said cavity in the rear form, a pin and slot connection between said connecting member and the rear form which permits sliding movement of said rear form on said connecting member, and a spring located in said cavity in the rear form and cooperating with said connecting member to press the rear form rearwardly away from the front form.

3. A shoe tree comprising a front form composed of laterally movable sections, a spring for pressing said sections apart, a transverse rod connecting the rear portions of said form sections and adapted to limit the outward movement thereof, a rear form having a longitudinal cavity therein, a longitudinal split tube pivoted on said transverse rod between said front form sections and slidably engaging in said cavity in the rear form, said tube having longitudinal slots in its opposite sides, a pin secured in said rear form and extending through said slots and slidably connecting the rear form to said tube, and a spring located in said cavity in the rear form and cooperating with said tube to press the rear form rearwardly away from the front form.

4. A shoe tree comprising a front form composed of laterally movable sections provided with aligned spring pockets in their inner sides, a coil spring seated in said pockets for pressing said sections apart, a slotted plate secured in one of said sections in front of said spring and slidably engaging in a narrow slot in the other section, a pin secured in the latter section and slidably engaging in said plate slot, a transverse rod loosely connecting said sections in rear of said spring and adapted to limit the outward movement of the sections, a rear form, and means pivotally and expansibly connecting said front and rear forms.

CLEMENTS B. KOSTERS.